United States Patent

Bush

[15] 3,675,526
[45] July 11, 1972

[54] SAW ASSEMBLY FOR SHEET MATERIAL

[72] Inventor: William R. Bush, 431 Portercrest Drive, Graysville, Ala. 35562

[22] Filed: July 27, 1970

[21] Appl. No.: 58,562

[52] U.S. Cl. ............................83/676, 143/133 R, 144/237
[51] Int. Cl. ............................B23d 45/10, B26d 1/14
[58] Field of Search..................83/663, 664, 665, 666, 676, 83/470, 674; 143/133 R, 133 C, 133 J, 155 R, 155 A; 144/237, 218, 222

[56] References Cited

UNITED STATES PATENTS

| | | | |
|---|---|---|---|
| 59,472 | 11/1866 | Stephens | 144/222 |
| 3,323,567 | 6/1967 | Segal | 143/133 R |
| 3,181,577 | 5/1965 | Gaskins | 143/133 R |
| 2,512,970 | 6/1950 | Rogne | 143/155 A |
| 1,813,231 | 7/1931 | Crowe | 143/43 C |
| 2,788,812 | 4/1957 | Jacobs | 144/237 |
| 2,015,877 | 10/1935 | Thompson | 83/665 |
| 3,413,889 | 12/1968 | Frank, Sr. | 83/666 X |
| 336,661 | 2/1886 | Peck | 143/155 R |

Primary Examiner—Andrew R. Juhasz
Assistant Examiner—James F. Coan
Attorney—Jennings, Carter & Thompson

[57] ABSTRACT

Saw assembly having thin disc member with cutting teeth on periphery and back-up disc secured to side. Cutting teeth project outwardly of back-up disc. Disc member and back-up disc secured to flat surface of rotatable member for rotation therewith.

3 Claims, 5 Drawing Figures

PATENTED JUL 11 1972

3,675,526

INVENTOR.
William R. Bush
BY Jennings, Carter + Thompson
Attorneys

SAW ASSEMBLY FOR SHEET MATERIAL

BACKGROUND OF THE INVENTION

This invention relates to a saw assembly and more particularly to a saw for cutting sheet material, such as sheet metal forming body and fender members for vehicles and sheet material employed in heating and air conditioning systems.

As is well known in the art to which my invention relates, difficulties have been encountered in cutting thin sheet material due to the fact that such material is easily distorted thus often necessitating the use of hand operated shears in cutting thin sheets, such as sheet metal ducts. While various cutting tools have been proposed for cutting sheet metal forming body and fender members of vehicles, such tools have been unsatisfactory due to the fact that they either distort the metal or the tools are too fragile whereby they wear out quickly.

BRIEF SUMMARY OF THE INVENTION

In accordance with my invention, I provide a saw assembly which makes a smooth cut in sheet material with a minimum of effort. The assembly comprises thin disc saws with cutting teeth on the peripheries thereof. A back-up disc is secured to at least one side of the disc saw with the periphery of the back-up disc terminating adjacent and inwardly of the cutting teeth on the disc saw. The disc saws and the back-up disc are secured to a flat face carried by a rotatable member whereby the disc saws and the back-up disc rotate as a unit with the rotatable member.

A saw assembly embodying features of my invention is illustrated in the accompanying drawing, forming a part of this application, in which.

Figure 1:
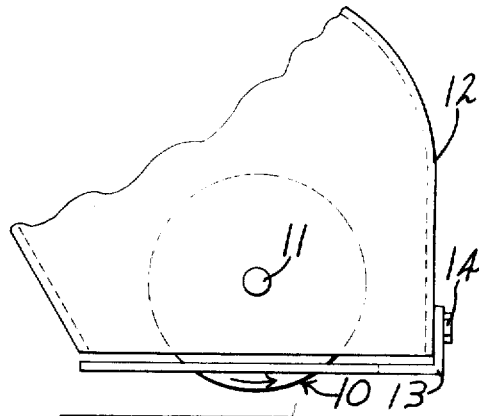
FIG. 1 is a side elevational view, partly broken away, showing my improved saw assembly mounted in a housing therefor.
Figure 2:
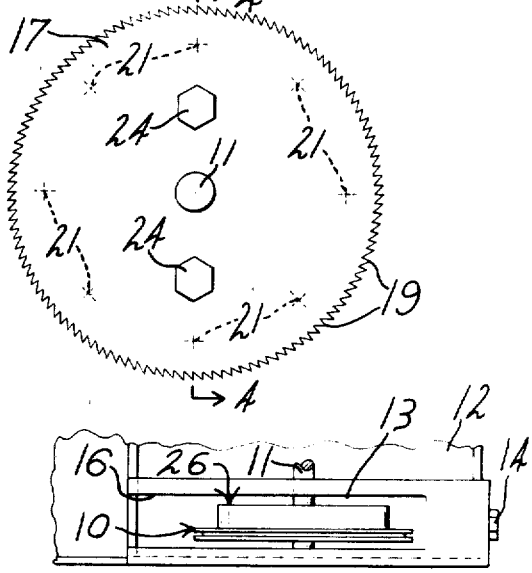
FIG. 2 is a fragmental view looking up from the bottom of FIG. 1.

Referring now to the drawing for a better understanding of my invention, I show the saw assembly generally at 10 mounted non-rotatably on a shaft 11 which extends transversely of a housing 12 with the lower portion of the saw assembly 10 projecting from the lower end of the housing, as shown in FIG. 1. The depth of the cut made by the saw assembly 10 is varied by a depth gauge member 13 which is in the form of an L-shape member having one leg thereof adjustably secured to the side of the housing 12 by a retaining bolt 14. The other leg of the depth gauge 13 extends horizontally beneath the housing 12 and is provided with a U-shaped recess 16 therein for receiving the lower periphery of the saw assembly 10, as shown in FIG. 2.

Figure 4:
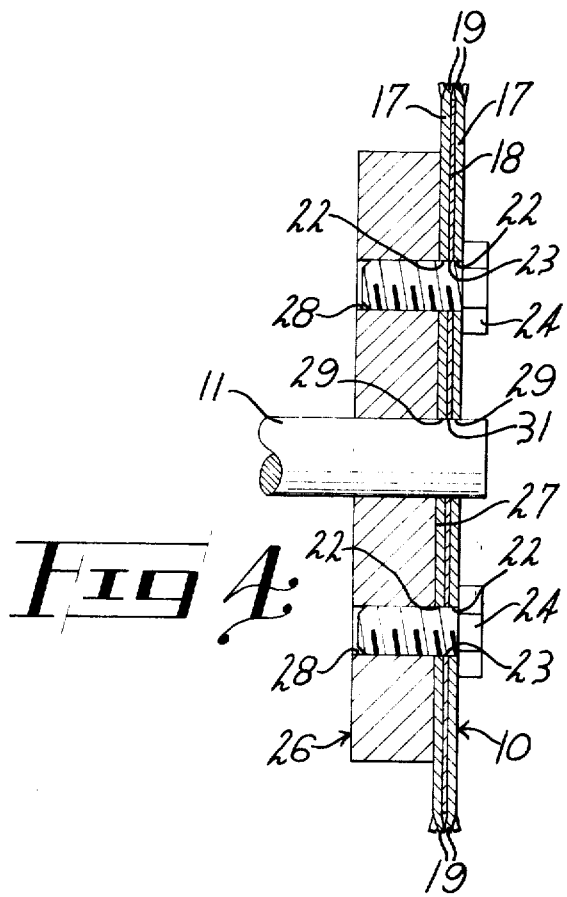
FIG. 4 is an enlarged, sectional view taken along the line 4—4 of FIG. 3.
Figure 3:
FIG. 3 is a side elevational view of the saw assembly removed from the housing and drawn to a larger scale.

The saw assembly shown in FIGS. 3 and 4 comprises a pair of spaced apart, thin, disc saws 17. Mounted between the disc saws 17 is a back-up disc 18 which extends parallel to the disc saws 17 with the periphery of the back-up disc terminating adjacent and inwardly of the cutting teeth 19 at the periphery of the disc saws 17. Preferably, the disc saws 17 and the back-up disc 18 are all formed of metal and are secured rigidly to each other by suitable means, such as by welding as at 21. As shown in FIG. 4, one-half the thickness of the back-up disc 18 is equal substantially the width of the lateral set at one side of the cutting teeth 19 at the periphery of the disc saws 17. Accordingly, the total thickness of the back-up disc 18 is equal the combined lateral set in the two adjacent disc saws 17 whereby the adjacent cutting teeth 19 are substantially in contact with each other, as shown in FIG. 4.

Aligned openings 22 are provided in each of the disc saws 17 which are also in alignment with openings 23 provided in the back-up disc 18 for receiving retainer elements 24 in the form of cap screws or the like. A rotatable member 26 is secured non-rotatably to the shaft 11 and is provided with a flat face 27 which is adapted to engage the adjacent side of a disc saw 17, as shown in FIG. 4. Threaded openings 28 are provided in the rotatable member 26 for receiving the threaded ends of the cap screws 24 whereby the disc saws 17 and the back-up disc 18 secured thereto are all secured rigidly to the rotatable member 26. As shown in FIG. 4, a centrally disposed opening 29 is provided in each of the disc saws 17 and a centrally disposed opening 31 is provided in the back-up disc 18 for receiving the end of the shaft 11.

Figure 5:
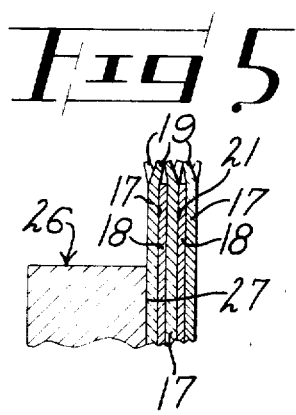
FIG. 5 is a fragmental, sectional view showing a modified form of the saw assembly.

In FIG. 5 of the drawing, I show a modified form of my invention in which the saw assembly comprises a plurality of disc saws 17 and back-up discs 18. That is, a back-up disc 18 is mounted at each side of a centrally disposed disc saw 17 while a disc saw 17 is then mounted at the outer side of each of the back-up discs 18. Adjacent back-up discs and disc saws 17 are secured to each other, as described hereinabove, by welding as at 21. Also, the disc saws 17 and their back-up discs 18 are secured to the rotatable member 26, as described hereinabove.

From the foregoing description, the operation of my improved saw assembly will be readily understood. The disc saws 17 are secured to the back-up discs 18 by welding as at 21 or by other suitable means to rigidly secure the back-up disc to the disc saws. The disc saws 17 and the back-up discs 18, thus are secured to each other, are then secured to the flat face 27 of the rotatable member 26 by the cap screws 24 whereby the saw assembly 10 rotates as a unit with the shaft 11 within the housing 12. The depth guide 13 is adjusted so that the lower periphery of the disc saws 17 make a cut of the desired depth.

From the foregoing, it will be seen that I have devised an improved saw assembly which is particularly adapted for cutting thin metals. By providing rigidity to the saw assembly and at the same time providing relatively thin cutting saws, a smooth, neat, cut is made without distortion of the thin material being cut, such as metal, plastic or the like. Also, by providing the back-up disc adjacent the disc saws, I provide a very sturdy structure which resists breakage of the disc saws. Furthermore, by providing a saw assembly which may be readily assembled and disassembled, a minimum of time and effort is required to change the saw assembly. Furthermore, I have provided a saw assembly which is extremely simple of construction, economical of manufacture and one which is particularly adapted for mass production.

While I have shown my invention in but two forms, it will be obvious to those skilled in the art that it is not so limited, but is susceptible of various other changes and modifications without departing from the spirit thereof.

What I claim is:

1. In a saw assembly for cutting sheet material,
   a. at least one thin disc saw having cutting teeth on the periphery thereof,
   b. at least one back-up disc extending parallel to and welded to said disc saw at angularly spaced locations to define an integral unit with the periphery of said back-up disc terminating adjacent and inwardly of said cutting teeth on the disc saw,
   c. a rotatable member having a flat face extending alongside and parallel to said back-up disc, and
   d. means detachably securing said integral unit consisting of said disc saw and said back-up disc to said flat face of said rotatable member for rotation therewith.

2. A saw assembly as defined in claim 1 which a disc saw is welded to each side of said back-up disc.

3. A saw assembly as defined in claim 1 in which a back-up disc is welded to each side of a centrally disposed disc saw and a disc saw is welded to the other side of each said back-up disc.

* * * * *